United States Patent Office 3,072,706
Patented Jan. 8, 1963

3,072,706
CYCLOPENTENYL CYCLOPENTENEACETIC
ACID AND DERIVATIVES
John T. Fitzpatrick and Erich Marcus, Charleston,
W. Va., assignors to Union Carbide Corporation, a
corporation of New York
No Drawing. Filed Sept. 8, 1960, Ser. No. 54,573
7 Claims. (Cl. 260—468)

This invention relates to novel compositions of matter and the processes by which they are made.

This application is a continuation-in-part of application Serial No. 34,393, filed June 7, 1960, now Patent No. 3,014,960, which relates to cyclopenteneacetic acids.

This invention relates to compounds which are characterized by the fact that they contain a bi(cyclopentenyl) nucleus which is substituted on the carbon atom alpha or beta to the junction of the two cyclopentenyl rings.

The novel compounds of this invention have been found to exist as mixtures of the following isomers, with the isomer represented by Formula 1 predominating.

(1)
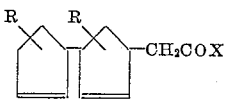

and (2)
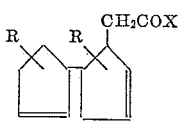

where R represents hydrogen and an alkyl group containing from 1 to 12 carbon atoms and X represents OR, Cl, Br and $NR_2$.

A novel, useful subclass of compounds within the scope of this invention include cyclopentenylcyclopenteneacetic acids, which exist as a mixture of two isomers characterized by the following general formulas:

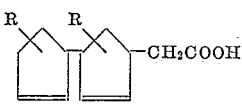

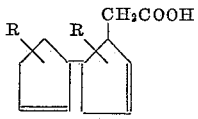

wherein R represents hydrogen or an alkyl group having from 1–12 carbon atoms. Thus, R can be methyl, proply, butyl, decyl, etc. It is to be understood that the compounds within this subclass have utility which is independent of the specific alkyl group and its position.

Specific compounds in this subclass include cyclopentenylcyclopenteneacetic acid which exists as a mixture of the following two isomers:

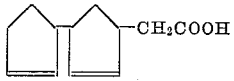

4-(2-cyclopentenyl)-2-cyclopenteneacetic acid

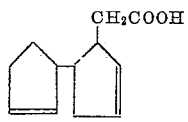

5-(2-cyclopentenyl)-2-cyclopenteneacetic acid and methylcyclopentenylmethylcyclopenteneacetic acid which exists as a mixture of the following isomers:

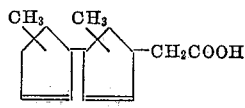

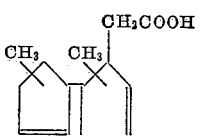

Another novel and useful subclass of compounds coming within the scope of this invention include the cyclopentenylcyclopenteneacetyl halides, which exist as a mixture of isomers corresponding to the general formulas:

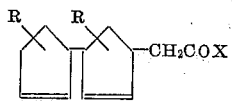

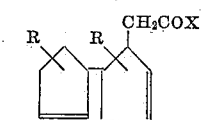

wherein R represents hydrogen or an alkyl group having from 1 to 12 carbon atoms and X represents chlorine or bromine. It is again to be understood that the specific alkyl groups as well as their position do not affect the usefulness of this class of compounds since their utility is due to their nucleus.

Specific compounds in this subclass include (1) cyclopentenylcyclopenteneacetyl chlorides which exist as a mixture of the following two isomers:

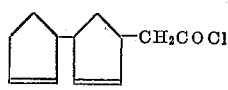

4-(2-cyclopentenyl)-2-cyclopenteneacetyl chloride and

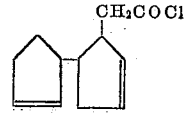

5-(2-cyclopentenyl)-2-cyclopenteneacetyl chloride (2) cyclopentenylcyclopenteneacetyl bromide, which exists as a mixture of the following two isomers:

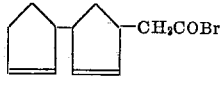

4-(2-cyclopentenyl)-2-cyclopenteneacetyl bromide

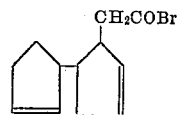

5-(2-cyclopentenyl)-2-cyclopenteneacetyl bromide and (3) methylcyclopentenylmethylcyclopenteneacetyl chloride, which exists as a mixture of the following isomers:

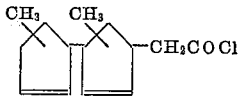

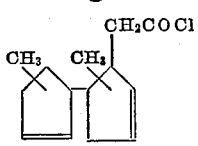

Only one isomeric form will be set forth for the remaining classes of compounds within the scope of this invention for the sake of brevity. It is to be understood that the other isomer which is not illustrated would have a structure similar to that set forth in the general formula.

Another novel, useful subclass of compounds within the scope of this invention includes the cyclopentenylcyclopenteneacetates. One isomeric form of these compounds corresponds to the general formula:

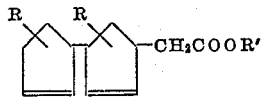

wherein R represents hydrogen or alkyl groups having from 1-12 carbon atoms and R' represents an alkyl group having from 1-12 carbon atoms. Thus, R' can be ethyl, methyl, propyl, hexyl, etc.

Specific compounds of this subclass include (1) ethyl cyclopentenylcyclopenteneacetate, an isomer of which corresponds to the following formula:

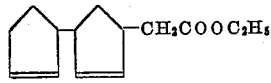

Ethyl 4-(2-cyclopentenyl)-2-cyclopenteneacetate (2) methylcyclopentenylcyclopenteneacetate, an isomer of which corresponds to the formula:

and (3) a methyl substituted ethyl cyclopentenylcyclopenteneacetate, an isomer of which corresponds to the formula:

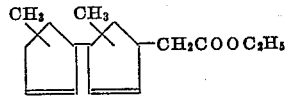

Another novel, useful subclass of compounds coming within the scope of this invention include the cyclopentenylcyclopenteneacetamides, an isomeric form of which corresponds to the following formula:

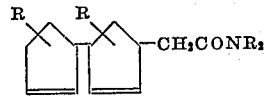

wherein R represents hydrogen or an alkyl group having from 1 to 12 carbon atoms.

Specific compounds in this group include (1) cyclopentenylcyclopenteneacetamide, an isomer of which corresponds to the formula:

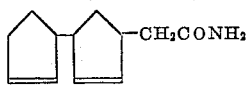

4-(2-cyclopentenyl)-2-cyclopenteneacetamide (2) cyclopentenylcyclopentenyl N,N-dimethylacetamide, an isomer of which corresponds to the formula:

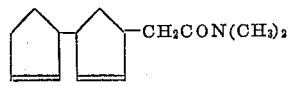

and (3) methylcyclopentenylmethylcyclopenteneacetamide, an isomer of which corresponds to the formula:

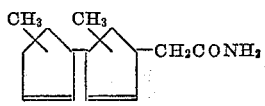

Cyclopentenylcyclopenteneacetyl halides are prepared by reacting ketene with a cyclopentenylcyclopentenyl halide in the presence of a Friedel-Crafts catalyst. Cyclopentenylcyclopentenyl halides are prepared by the reaction of a cyclopentadiene and a 3-halocyclopentene as disclosed in U.S. application, Ser. No. 54,579 by King, Starcher and Tinsley, entitled "Novel Compounds and Processes," filed September 8, 1960.

As previously set forth, cyclopentenylcyclopenteneacetyl halides are prepared by reacting ketene with a cyclopentenylcyclopentenyl halide in contact with a catalyst.

The proportion of reactants is not critical and can vary over a wide range. A preferred range is from about 0.5 to 2 mols of ketene per mol of cyclopentenylcyclopentenyl halide. The preferred molar ratio is 1:1.

The temperature at which the reaction is conducted may vary from about $-85$ to $+85°$ C. The preferred range is from $-50$ to $+20°$ C. Since the reaction is exothermic, the desired temperature must be maintained with a proper cooling bath.

The catalysts which are used in the reaction are the Friedel-Crafts catalysts. These catalysts include zinc chloride, stannic chloride, zinc bromide, ferric chloride, etc. The preferred catalyst is zinc chloride.

The amount of catalyst which can be used is not narrowly critical and can vary over a wide range. A preferred range is from 0.01 to 10.0 percent by weight based on the cyclopentenylcyclopentenyl halide.

It is to be understood that the cyclopentenylcyclopenteneacetyl halides can be prepared directly by reacting a 3-halocyclopentene, a cyclopentadiene and ketene in the presence of a Friedel-Crafts catalyst.

The remaining compounds of this invention are prepared from the acetyl halide by conventional means such as hydrolysis, reaction with an alcohol, etc.

The following chart will illustrate the preparation of the novel compounds of this invention. Only one isomeric form is shown for convenience.

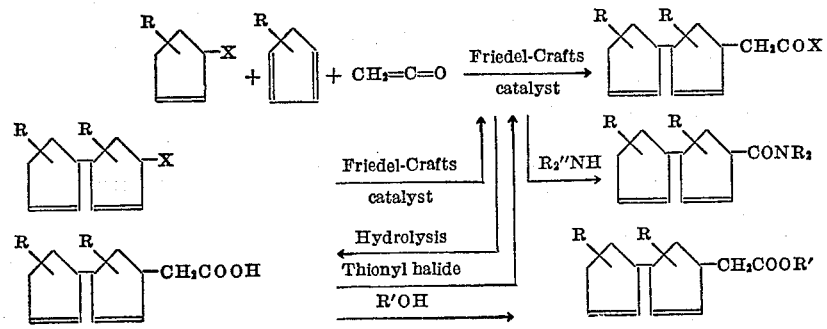

X=Cl or Br
R=alkyl or hydrogen
R'=alkyl

The novel compounds of this invention can be used in a variety of ways. The novel acids, esters, amides or acetyl halides can be used in the classic ways any of the simple acids, esters, etc. are used. Thus, the instant compounds can be used as solvents, diluents and as electrolytes. Additionally, these compounds can be added to drying oil acids such as oleic, linoleic, linolenic, or to natural oils such as soybean oil, peanut oil, etc. to upgrade their drying ability, because of the unsaturation in the cyclopentenylcyclopentenyl ring.

EXAMPLE 1

Cyclopentenylcyclopenteneacetic Acid

Cyclopentadiene (528 grams, 8.0 mols) was added during a period of two hours with stirring to a mixture of 3-chlorocyclopentene (820 grams, 8.0 mols) and pulverized zinc chloride (0.8 gram), while the temperature was maintained between 0° and —5° C. The mixture was stirred for an additional two hours at 0° C. The crude cyclopentenylcyclopentenyl chloride was used for the further reaction with ketene in this form.

Ketene (504 grams, 12.0 mols) was added to the crude cyclopentenylcyclopentenyl chloride during a period of two hours, while the temperature was maintained at about —5°. The mixture was stirred for an additional thirty minutes at the same temperature. The reaction product was added slowly to a sodium hydroxide solution. After extraction with petroleum ether (B.P. 35–37°), the aqueous layer was acidified with concentrated hydrochloric acid. The crude cyclopentenylcyclopenteneacetic acid was separated with the help of petroleum ether (B.P. 35–37°). After removal of solvent, 1219 grams of crude product was obtained. Distillation without rectification gave 120 grams boiling up to 180° C./3.0 mm. Redistallation on a vigreux column afforded 78 g. (8 percent yield), B.P. 80–93°/0.66 mm., of 2-cyclopenteneacetic acid, 52 grams boiling from 93 to 131° at 0.6 mm. of Hg and 611 grams (40 percent yield), B.P. 131/0.6–139°/0.7 mm., of Hg, of (2-cyclopentenyl)-2-cyclopenteneacetic acid, which existed as a mixture of the following two isomers.

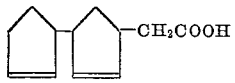

and

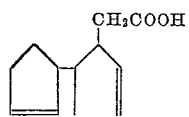

A cut of said isomeric mixture boiling at 131–134° C./0.66 mm. Hg was analyzed $n_D^{20}$ 1.5046, $d^{20}$ 1.056.

ANALYSIS

| $C_{12}H_{16}O_2$ | Neutral Equiv. | H | C | $M_D$ | Hydrogen Number |
|---|---|---|---|---|---|
| Calcd | 192 | 8.33 | 75.00 | 53.83 | 96.1 |
| Found | 197 | 8.37 | 75.46 | 53.9 | 93.6 |

EXAMPLE 2

Cyclopentenylcyclopenteneacetyl Chloride

Thionyl chloride (131 grams, 1.1 mols) was added dropwise with stirring during a one-hour period to a solution of cyclopentenylcyclopenteneacetic acid (192 grams, 1.0 mol) in anhydrous benzene (100 ml.), while the temperature was maintained at 50°. The reaction was heated with stirring for two more hours at 50° and distilled without rectification to give 150 grams (71 percent yield) of an isomeric mixture, B.P. 108–111°/1.75 mm., $n_D^{20}$ 1.5072, $d^{20}$ 1.086 which existed as a mixture of:

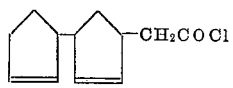

and

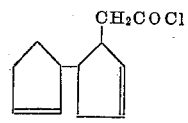

ANALYSIS

| $C_{12}H_{15}OCl$ | C | H | Cl | Neutral Equiv. | $M_D$ |
|---|---|---|---|---|---|
| Calcd | 68.40 | 7.18 | 16.80 | 105.7 | 57.18 |
| Found | 68.41 | 7.19 | 16.84 | 107 | 57.5 |

EXAMPLE 3

Ethyl Cyclopentenylcyclopenteneacetate

A mixture of cyclopentenylcyclopenteneacetic acid (288 grams, 1.5 mols), ethanol (184 grams, 4 mols), benzene (200 ml.), and concentrated sulfuric acid (3 ml.) was refluxed with stirring for about five hours. The water of the reaction was removed azeotropically through a 3' long column. After washing with a sodium carbonate solution, the organic layer was distilled to give 248 grams of ethyl cyclopentenylcyclopenteneacetate (75 percent yield), B.P. 91–96°/0.3 mm. Hg, $n_D^{20}$ 1.4832, $d^{20}$ 0.997 as a mixture of two isomers:

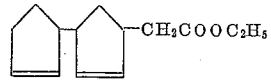

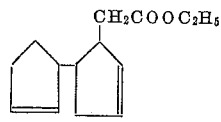

ANALYSIS

| $C_{14}H_{20}O_2$ | C | H | $M_D$ |
|---|---|---|---|
| Calcd | 76.36 | 9.09 | 63.19 |
| Found | 76.36 | 9.10 | 63.0 |

EXAMPLE 4

Cyclopentenylcyclopenteneacetamide

Cyclopentenylcyclopenteneacetyl chloride (120 grams, 0.6 mol) was added during a period of one-half hour with stirring to a solution of concentrated ammonium hydroxide (122 grams, 2 mols) and water (200 ml.), while the temperature was maintained at 0° C. After stirring at 0° for another one-half hour, a white solid was collected by filtration and dried to give 100 grams of product (88% yield), M.P. 108–112° with softening at about 100°. The product was a mixture of the following two isomers:

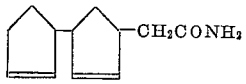

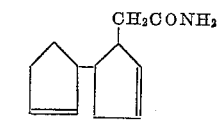

Recrystallization from ethyl acetate afforded an analytically pure sample, M.P. 117–120°.

ANALYSIS

| $C_{12}H_{17}NO$ | C | H | N |
|---|---|---|---|
| Calcd | 73.50 | 8.90 | 7.33 |
| Found | 73.89 | 8.87 | 7.04 |

What is claimed is:
1. Bicyclopentenyl compounds which are mixtures of isomers selected from the group consisting of:

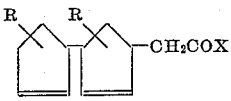

and

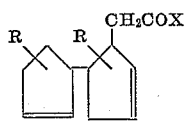

where X is selected from the group consisting of OR, Cl, Br, and $NR_2$ and each R is selected from the group consisting of hydrogen and alkyl groups having from 1 to 12 carbon atoms.

2. Mixtures of bicyclopentenyl compounds as defined in claim 1 wherein X is OR with each R being an alkyl group having from 1 to 12 carbon atoms.
3. Mixtures of bicyclopentenyl compounds as defined in claim 1 wherein X is OH and each R is hydrogen.
4. Mixtures of bicyclopentenyl compounds as defined in claim 1 wherein X is Cl and each R is hydrogen.
5. Mixtures of bicyclopentenyl compounds as defined in claim 1 wherein X is Br and each R is hydrogen.
6. Mixtures of bicyclopentenyl compounds as defined in claim 1 wherein X is —$OC_2H_5$ and each R is hydrogen.
7. Mixtures of bicyclopentenyl compounds as defined in claim 1 wherein X is $NH_2$ and each R is hydrogen.

References Cited in the file of this patent

UNITED STATES PATENTS

| 2,316,465 | Staudinger et al. | Apr. 13, 1943 |
| 2,773,092 | Carley et al. | Dec. 4, 1956 |

FOREIGN PATENTS

| 306,508 | Switzerland | June 16, 1955 |

OTHER REFERENCES

Beilstein: Vol. IX, page 371 (2nd Supp.), 1949.